United States Patent
Tsuda et al.

(10) Patent No.: US 10,947,471 B2
(45) Date of Patent: Mar. 16, 2021

(54) GREASE COMPOSITION AND ROLLING BEARING

(71) Applicant: JTEKT CORPORATION, Osaka (JP)

(72) Inventors: Takeshi Tsuda, Kashiba (JP); Yurie Hagino, Kashihara (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/599,151

(22) Filed: Oct. 11, 2019

(65) Prior Publication Data
US 2020/0157453 A1 May 21, 2020

(30) Foreign Application Priority Data

Nov. 19, 2018 (JP) .............................. JP2018-216758

(51) Int. Cl.
| | |
|---|---|
| *F16C 33/20* | (2006.01) |
| *C10M 173/02* | (2006.01) |
| *C10M 107/02* | (2006.01) |
| *C10M 125/30* | (2006.01) |
| *C10M 169/02* | (2006.01) |
| *C10M 169/06* | (2006.01) |
| *C10M 159/12* | (2006.01) |
| *C10M 135/18* | (2006.01) |
| *F16C 19/00* | (2006.01) |

(Continued)

(52) U.S. Cl.
CPC ........ *C10M 107/02* (2013.01); *C10M 119/24* (2013.01); *C10M 125/30* (2013.01); *C10M 135/18* (2013.01); *C10M 159/12* (2013.01); *C10M 169/02* (2013.01); *C10M 169/06* (2013.01); *F16C 19/00* (2013.01); *C10M 2201/103* (2013.01); *C10M 2205/003* (2013.01); *C10M 2215/065* (2013.01); *C10M 2217/045* (2013.01); *C10M 2219/068* (2013.01); *C10M 2290/00* (2013.01); *C10N 2020/02* (2013.01); *C10N 2030/10* (2013.01); *C10N 2040/02* (2013.01)

(58) Field of Classification Search
CPC ...... C10M 2201/103; C10M 2205/003; C10M 2290/00; C10M 2215/064; C10M 2215/1026; C10M 2201/1036; C10M 2205/0285; C10N 2050/10
USPC .................................................. 508/100, 528
See application file for complete search history.

(56) References Cited

U.S. PATENT DOCUMENTS

| | | | | |
|---|---|---|---|---|
| 4,664,820 A | * | 5/1987 | Magauran ............ | C10M 113/16 508/136 |
| 4,800,031 A | * | 1/1989 | DiBiase ............... | C10M 167/00 508/497 |
| 2007/0072777 A1 | * | 3/2007 | Okamura ............. | C10M 169/02 508/367 |

FOREIGN PATENT DOCUMENTS

| | | |
|---|---|---|
| JP | 2008-275037 A | 11/2008 |
| JP | 2017-200981 A | 11/2017 |

\* cited by examiner

*Primary Examiner* — Prem C Singh
*Assistant Examiner* — Francis C Campanell
(74) *Attorney, Agent, or Firm* — Oliff PLC (57) ABSTRACT

A grease composition includes base oil, a thickener, and an inorganic additive. The base oil is a poly-α-olefin having a base oil kinematic viscosity of 15 to 50 mm$^2$/s at 40° C. The thickener is a diurea expressed by Structural Formula (1). The content of the thickener is 10 to 22 mass % with respect to the total amount of the base oil and the thickener. The inorganic additive is a mixture containing sepiolite and bentonite, and is organically modified. The content of the inorganic additive is 2 to 20 mass % with respect to the total amount of the base oil and the thickener.

$$R^1\text{—NHCONH—}R^2\text{—NHCONH—}R^3 \qquad (1)$$

3 Claims, 7 Drawing Sheets

(51) Int. Cl.
*C10M 119/24* (2006.01)
*C10N 20/02* (2006.01)
*C10N 40/02* (2006.01)
*C10N 30/10* (2006.01)

GREASE COMPOSITION AND ROLLING BEARING

INCORPORATION BY REFERENCE

The disclosure of Japanese Patent Application No. 2018-216758 filed on Nov. 19, 2018 including the specification, drawings and abstract is incorporated herein by reference in its entirety.

BACKGROUND

1. Technical Field

The present disclosure relates to a grease composition and a rolling bearing filled with the grease composition.

2. Description of Related Art

In recent years, there is a demand for bearing grease having a characteristic that a bearing running torque can be reduced in order to meet a need to reduce energy and increase efficiency. As a rolling bearing whose torque reduction characteristic is improved, for example, Japanese Unexamined Patent Application Publication No. 2008-275037 (JP 2008-275037 A) proposes a rolling bearing filled with a grease composition to which a polyisobutylene-based viscosity index improver is added. However, the grease composition that fills the rolling bearing of JP 2008-275037 A has a poor heat resistance and an insufficient lubrication life.

Japanese Unexamined Patent Application Publication No. 2017-200981 (JP 2017-200981 A) describes grease using a diurea-based thickener. JP 2017-200981 A suggests that the viscosity reduction energy of the grease increases when the carbon chain length of an aliphatic amine that is a material for the thickener decreases and the bearing running torque decreases when the viscosity reduction energy of the grease increases (see FIG. 2 of JP 2017-200981 A).

SUMMARY

Major factors that affect a bearing running torque in a ball bearing filled with grease are (1) a stirring resistance of the grease that fills the ball bearing, (2) a rolling viscosity resistance, (3) a sliding friction resistance between balls and a resin cage, and (4) a sliding friction resistance between the balls and raceways. Among those factors, (1) the stirring resistance of the grease may significantly affect the bearing running torque because the grease is semi-solid. In order to reduce the stirring resistance of the grease, it may be necessary to improve a channeling characteristic of the grease so as not to hinder ball running.

In this respect, the grease containing the diurea-based thickener can be expected to improve the channeling characteristic if the viscosity reduction energy is increased. When the carbon chain length of the aliphatic amine that is the material for the diurea-based thickener is reduced in order to increase the viscosity reduction energy, there is a possibility that the heat resistance of the grease is insufficient and the lubrication life decreases. Therefore, the grease composition that fills the rolling bearing is required to achieve torque reduction with a heat resistance required as bearing grease.

The inventors have conducted extensive research to meet the demand described above, and completed the present disclosure with the findings that a grease composition containing a specific inorganic additive is suitable to reduce a bearing running torque with a heat resistance.

A grease composition according to a first aspect of the present disclosure includes base oil, a thickener, and an inorganic additive. The base oil is a poly-α-olefin having a base oil kinematic viscosity of 15 to 50 mm²/s at 40° C. The thickener is a diurea expressed by Structural Formula (1).

$$R^1\text{—NHCONH—}R^2\text{—NHCONH—}R^3 \quad (1)$$

where $R^1$ and $R^3$ represent functional groups independent of each other and expressed by $-C_nH_{2n+1}$ (n is an integer of 6 to 10), and $R^2$ represents $-(CH_2)_6-$, $-C_6H_3(CH_3)-$, or $-C_6H_4-CH_2-C_6H_4-$.

A content of the thickener is 10 to 22 mass % with respect to a total amount of the base oil and the thickener. The inorganic additive is a mixture containing sepiolite and bentonite, and is organically modified. A content of the inorganic additive is 2 to 20 mass % with respect to the total amount of the base oil and the thickener.

The grease composition of the first aspect described above includes the thickener composed of the predetermined diurea and the base oil composed of the predetermined poly-α-olefin, and further includes the predetermined amount of the specific inorganic additive. The inorganic additive is the mixture containing sepiolite and bentonite, and is organically modified. The inorganic additive has excellent heat resistance because the inorganic additive contains minerals as main components. Further, the inorganic additive can function as a rheology regulator. Therefore, the grease composition has a heat resistance required as bearing grease, and a rolling bearing filled with the grease composition has a sufficient lubrication life. Further, viscosity reduction energy is increased because the grease composition contains the specific inorganic additive described above. Therefore, the rolling bearing filled with the grease composition can achieve a low bearing running torque.

The grease composition of the aspect described above may further include an antioxidant. The antioxidant may be at least one of 0.5 to 3 mass % of phenyl-1-naphthylamine with respect to the total amount of the base oil and the thickener, 0.5 to 3 mass % of octylated diphenylamine with respect to the total amount of the base oil and the thickener, and 0.5 to 3 mass % of zinc dibutyldithiocarbamate with respect to the total amount of the base oil and the thickener. A rolling bearing according to a second aspect of the present disclosure is a rolling bearing filled with the grease composition described above.

According to the grease composition of the first aspect of the present disclosure, the torque of the rolling bearing can be reduced with the heat resistance. The rolling bearing according to the second aspect of the present disclosure achieves the torque reduction while securing the lubrication life because the rolling bearing is filled with the grease composition.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
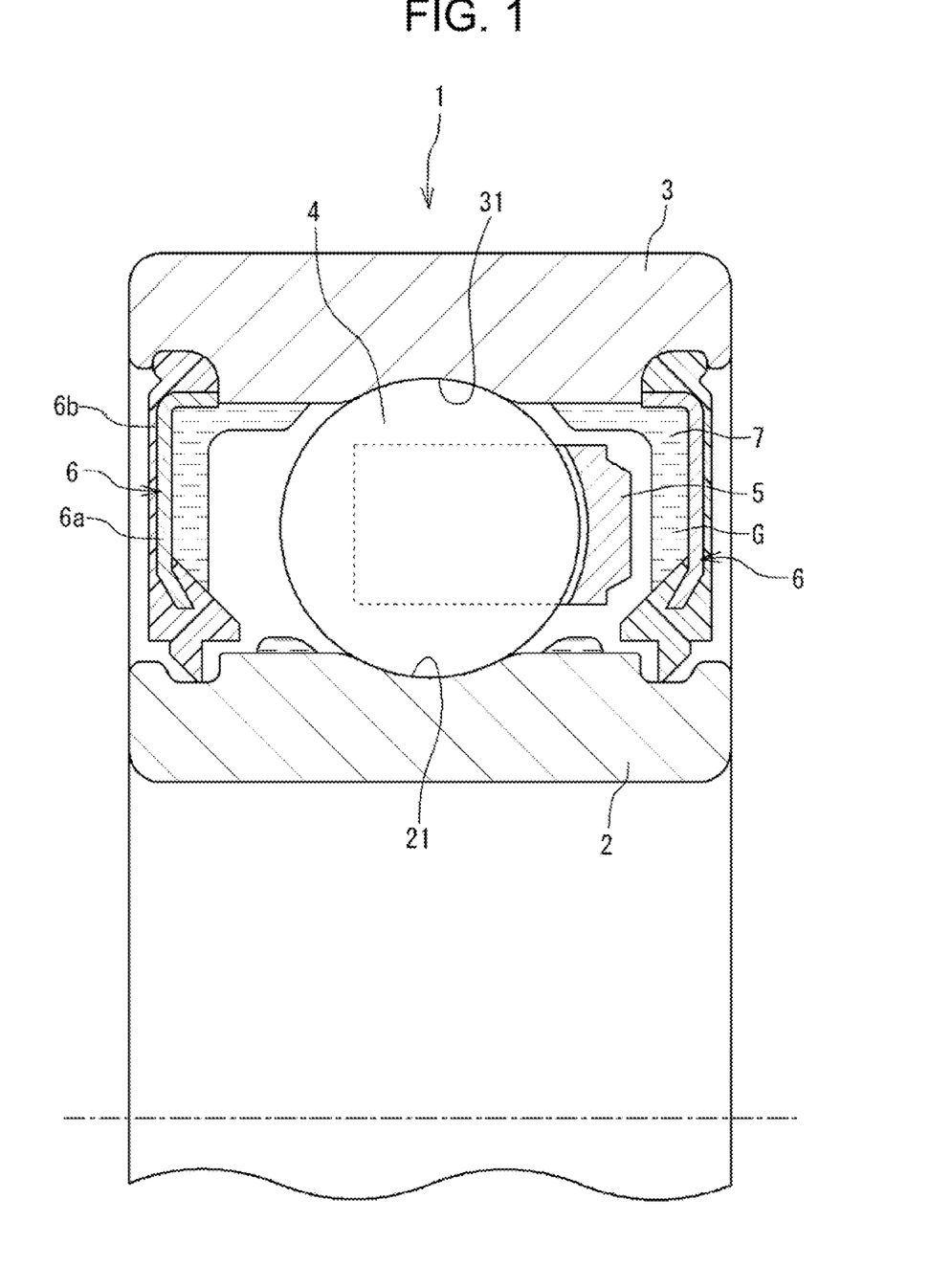
FIG. 1 is a sectional view illustrating a ball bearing according to one embodiment of the present disclosure.

An embodiment of the present disclosure is described below with reference to the drawings. A rolling bearing according to the embodiment is a ball bearing filled with grease composed of a grease composition according to the embodiment of the present disclosure. FIG. 1 is a sectional view illustrating the ball bearing according to the embodiment of the present disclosure. A ball bearing 1 includes an inner ring 2, an outer ring 3, a plurality of balls 4, and an annular cage 5. The outer ring 3 is provided on a radially outer side of the inner ring 2. The balls 4 serve as a plurality of rolling elements provided between the inner ring 2 and the outer ring 3. The cage 5 retains the balls 4. Seals 6 are provided on one side and the other side of the ball bearing 1 in its axial direction. An annular region 7 between the inner ring 2 and the outer ring 3 is filled with grease G composed of the grease composition according to the embodiment of the present disclosure.

The inner ring 2 has an inner raceway surface 21 on its outer periphery. The balls 4 roll along the inner raceway surface 21. The outer ring 3 has an outer raceway surface 31 on its inner periphery. The balls 4 roll along the outer raceway surface 31. The balls 4 are interposed between the inner raceway surface 21 and the outer raceway surface 31, and roll along the inner raceway surface 21 and the outer raceway surface 31. The grease G that fills the region 7 is also located at a contact portion between the balls 4 and the inner raceway surface 21 of the inner ring 2 and at a contact portion between the balls 4 and the outer raceway surface 31 of the outer ring 3. The grease G fills the region 7 so as to occupy 20 to 40 volume % with respect to the volume of a space surrounded by the inner ring 2, the outer ring 3, and the seals 6 and excluding the balls 4 and the cage 5. The seal 6 is an annular member including an annular metal core 6a and an elastic member 6b fixed to the metal core 6a. A radially outer portion of the seal 6 is fixed to the outer ring 3, and a radially inner portion of the seal 6 is attached to the inner ring 2 so that the seal 6 can be brought into sliding contact with the inner ring 2. The seal 6 prevents the grease G that fills the region 7 from leaking to the outside.

The ball bearing 1 constructed as described above is filled, as the grease G, with the grease composed of the grease composition according to the embodiment of the present disclosure as described later. Therefore, the bearing running torque is low and the lubrication life is sufficient.

Next, the grease composition that composes the grease G is described in detail. The grease composition that composes the grease G is the grease composition according to the embodiment of the present disclosure, and contains base oil, a thickener, and an inorganic additive. One technical feature of the grease composition is that the grease composition contains a predetermined amount of a specific inorganic additive. Since the grease composition contains the specific inorganic additive, viscosity reduction energy increases. When the viscosity reduction energy increases, the grease composition can contribute to torque reduction of the rolling bearing owing to, for example, improvement in a channeling characteristic.

Figure 2:
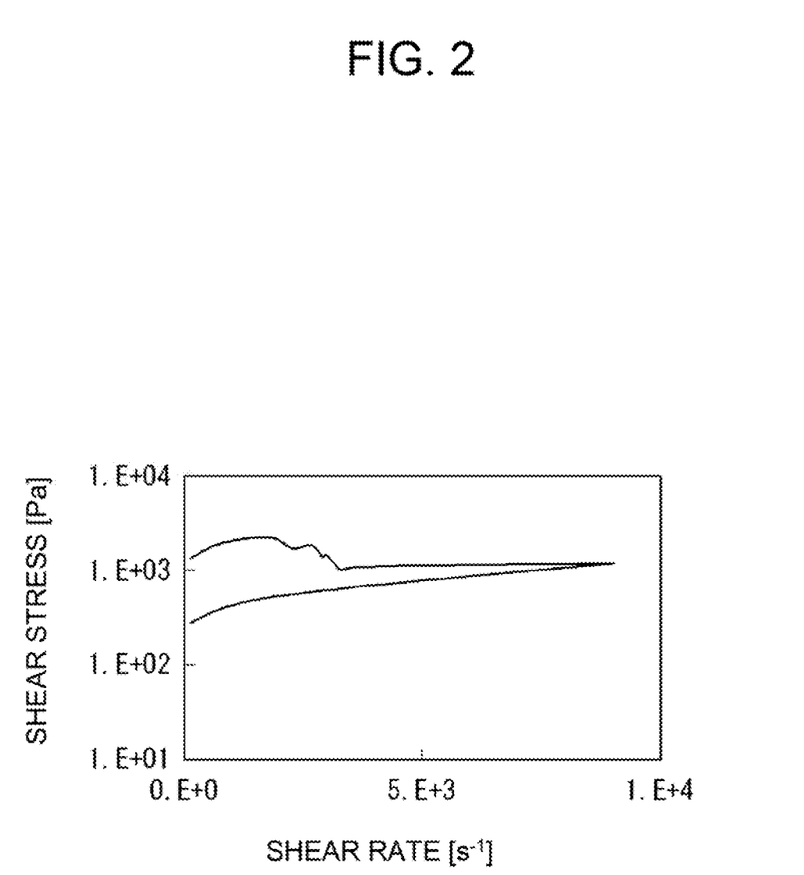
FIG. 2 is a diagram illustrating an example of a result of measurement of a hysteresis loop for obtaining viscosity reduction energy.

The viscosity reduction energy is one indicator of thixotropy, and can be obtained by the following method. FIG. 2 is a diagram illustrating an example of a result of measurement of a hysteresis loop for obtaining the viscosity reduction energy. The viscosity reduction energy can be obtained from the hysteresis loop of FIG. 2, which can be obtained through measurement using a rotary rheometer. For example, the hysteresis loop is constituted by a rising flow curve and a constant flow curve obtained by linearly increasing a shear rate from 0 $s^{-1}$ to 9000 $s^{-1}$, and a falling flow curve obtained by linearly reducing the shear rate from 9000 $s^{-1}$ to 0 $s^{-1}$. The area surrounded by those curves is the viscosity reduction energy, which may correspond to energy consumed when the viscosity decreases along with a change (orientation) in the crystal structure of the thickener. The grease composition may have a tendency that the running torque decreases as the viscosity reduction energy increases.

In the grease composition, the base oil is a poly-α-olefin (PAO). If the poly-α-olefin is selected as the base oil, the poly-α-olefin is suitable to reduce the torque while securing a heat resistance when used in combination with a thickener composed of a diurea.

Examples of the poly-α-olefin include an oligomerized or polymerized α-olefin such as 1-hexene, 1-octene, 1-nonene, 1-decene, 1-dodecene, or 1-tetradecene, and a poly-α-olefin obtained by hydrogenating the oligomerized or polymerized α-olefin described above. The poly-α-olefin is preferably one of PAO4 to PAO8, which is obtained by oligomerizing 1-decene.

The base oil has a base oil kinematic viscosity of 15 to 50 $mm^2/s$ at 40° C. In this case, the torque can be reduced while securing the heat resistance. If the base oil kinematic viscosity (40° C.) is less than 15 $mm^2/s$, the grease G has a poor heat resistance. If the base oil kinematic viscosity (40° C.) is more than 50 $mm^2/s$, the torque of the ball bearing filled with the grease G may increase. The base oil kinematic viscosity (40° C.) is preferably 25 to 35 $mm^2/s$. The value of the base oil kinematic viscosity conforms to JIS K 2283.

In the grease composition, the thickener contains a diurea expressed by Structural Formula (1).

$$R^1-NHCONH-R^2-NHCONH-R^3 \quad (1)$$

where $R^1$ and $R^3$ represent functional groups independent of each other and expressed by $-C_nH_{2n+1}$ (n is an integer of 6 to 10), and $R^2$ represents $-(CH_2)_6-$, $-C_6H_3(CH_3)-$, or $-C_6H_4-CH_2-C_6H_4-$.

If $R^2$ is $-C_6H_3(CH_3)-$, a phenylene group is preferably bonded at a 2,4 or 2,6 position. If $R^2$ is $-C_6H_4-CH_2-C_6H_4-$, both the phenylene groups are preferably bonded at a para position.

The diurea expressed by Structural Formula (1) is a reactant of an aliphatic amine and a diisocyanate compound. The aliphatic amine has a carbon number of 6 to 10, and specific examples include 1-aminohexane, 1-aminoheptane, 1-aminooctane, 1-aminononane, and 1-aminodecane. Among those examples, 1-aminooctane is preferred.

Examples of the diisocyanate compound include hexamethylene diisocyanate (HDI), 2,4-toluene diisocyanate (2,4-TDI), 2,6-toluene diisocyanate (2,6-TDI), a mixture of 2,4-TDI and 2,6-TDI, and 4,4'-diphenylmethane diisocyanate (MDI).

To obtain the diurea expressed by Structural Formula (1), the aliphatic amine and the diisocyanate compound may react under various conditions, but preferably react in the base oil because a diurea compound having a high homogeneous dispersibility is obtained as the thickener. The aliphatic amine and the diisocyanate compound may react such that base oil in which the diisocyanate compound is dissolved is added to base oil in which the aliphatic amine is dissolved, or the base oil in which the aliphatic amine is dissolved is added to the base oil in which the diisocyanate compound is dissolved.

There is no particular limitation on the temperature and time for the reaction of the aliphatic amine and the diisocyanate compound, and conditions similar to conditions generally employed in this type of reaction may be employed. The reaction temperature is preferably 150° C. to 170° C. from the viewpoint of solubility and volatility of the aliphatic amine and the diisocyanate compound. The reaction time is preferably 0.5 to 2.0 hours from the viewpoint of completing the reaction of the aliphatic amine and the diisocyanate compound or efficiently producing the grease in a shorter production time.

The content of the thickener is 10 to 22 mass % with respect to the total amount of the base oil and the thickener. If the content of the thickener is less than 10 mass %, the capacity of the grease that retains the base oil decreases to increase a possibility that the amount of base oil separated from the grease increases during rotation of the rolling bearing. If the content of the thickener is more than 22 mass %, a stirring resistance may increase. The stirring resistance is caused by shearing of the grease due to the rotation of the rolling bearing, that is, relative motion of the inner ring, the outer ring, the balls, and the cage. Therefore, the torque of the rolling bearing may increase. Further, the grease may generate heat along with the stirring resistance caused by the shearing of the grease. Therefore, oxidation of the grease or deterioration due to vaporization or separation of the base oil may accelerate. The content of the thickener is preferably 16 to 22 mass %.

In the grease composition, the inorganic additive is a mixture containing sepiolite and bentonite, and is organically modified. Sepiolite is a mineral having a chain structure. Bentonite is a mineral having a laminar or sheet-like structure. The inorganic additive can produce a three-dimensional structure of complex entanglement of sepiolite and bentonite. The inorganic additive is organically modified, and has an excellent affinity for the base oil. This inorganic additive is suitable to improve the channeling characteristic of the grease composition. Therefore, when the grease composition contains the inorganic additive, the bearing torque can be reduced while securing the heat resistance.

The inorganic additive is the mixture containing sepiolite and bentonite, and is an organically modified additive. Both sepiolite and bentonite may organically be modified, or only one of sepiolite and bentonite may organically be modified. In this inorganic additive, it is preferable that both sepiolite and bentonite be organically modified. In this case, the inorganic additive is more suitable to reduce the torque.

In the inorganic additive, the phrase "organically modified" means, for example, that the inorganic additive is treated by using a cationic surfactant. Examples of the cationic surfactant include a quaternary ammonium salt type cationic surfactant such as an alkyltrimethylammonium chloride, an alkyltrimethylammonium bromide, an alkyltrimethylammonium iodide, a dialkyldimethylammonium chloride, a dialkyldimethylammonium bromide, a dialkyldimethylammonium iodide, or an alkyl benzalkonium chloride, and an alkylamine salt type cationic surfactant such as a monoalkylamine salt, a dialkylamine salt, or a trialkylamine salt. Among those examples, the quaternary ammonium salt type cationic surfactant is preferred.

A commercially available product may also be used as the inorganic additive. Specific examples of the commercially available product include GARAMITE (registered trademark) 1958 (produced by BYK), GARAMITE (registered trademark) 2578 (produced by BYK), GARAMITE (registered trademark) 7303 (produced by BYK), and GARAMITE (registered trademark) 7305 (produced by BYK).

The content of the inorganic additive is 2 to 20 mass % with respect to the total amount of the base oil and the thickener. In this case, the grease composition is suitable to secure the heat resistance while reducing the running torque. If the content of the inorganic additive is less than 2 mass %, it is difficult to achieve both the torque reduction and the improvement in the heat resistance. If the content of the inorganic additive is more than 20 mass %, it is difficult to achieve the torque reduction though the heat resistance is improved. The content of the inorganic additive is preferably 5 to 10 mass % with respect to the total amount of the base oil and the thickener.

It is preferable that the grease composition further contains an antioxidant. By blending the antioxidant, the lubrication life of the grease composition can be improved. The antioxidant is preferably 0.5 to 3 mass % of phenyl-1-naphthylamine with respect to the total amount of the base oil and the thickener, 0.5 to 3 mass % of octylated diphenylamine with respect to the total amount of the base oil and the thickener, and 0.5 to 3 mass % of zinc dibutyldithiocarbamate with respect to the total amount of the base oil and the thickener. One of those antioxidants may be contained alone, but the three types of antioxidant are preferably used in combination. The grease composition may contain any other antioxidant.

For example, the grease composition may contain, as other additives, an extreme pressure agent, an oiliness improver, a rust inhibitor, an anti-wear agent, a dye, a hue stabilizer, a viscosity improver, a structural stabilizer, a metal deactivator, and a viscosity index improver.

Next, a method for producing the grease composition is described. For example, the grease composition can be produced by first preparing base grease containing the base oil and the thickener, then charging the obtained base grease with the inorganic additive and an arbitrary additive to be contained as necessary, and stirring and mixing the components with a revolution/rotation mixer or the like.

According to this embodiment, the grease composition containing the predetermined inorganic additive in addition to the poly-α-olefin and the diurea is employed as the grease composition that composes the grease G that fills the ball bearing 1. Since the grease composition contains the predetermined inorganic additive, the viscosity reduction energy can be increased. As a result, the bearing running torque can be reduced in the ball bearing 1 filled with the grease G. Further, the grease composition has a heat resistance required as bearing grease, and a sufficient lubrication life can be secured.

The present disclosure is not limited to the embodiment described above, but may be carried out in other embodiments. The rolling bearing according to the embodiment of the present disclosure is not limited to the ball bearing filled with the grease composed of the grease composition according to the embodiment of the present disclosure. The rolling bearing may be any other rolling bearing such as a roller bearing using rolling elements other than the balls as long as the bearing is filled with the grease composed of the grease composition according to the embodiment of the present disclosure.

Next, the present disclosure is described in more detail based on examples, but is not limited to only the examples. A plurality of grease compositions were prepared, and the properties of the grease compositions were evaluated. Table 1 shows components and evaluation results of the grease compositions.

Preparation of Base Grease

Figure 3:
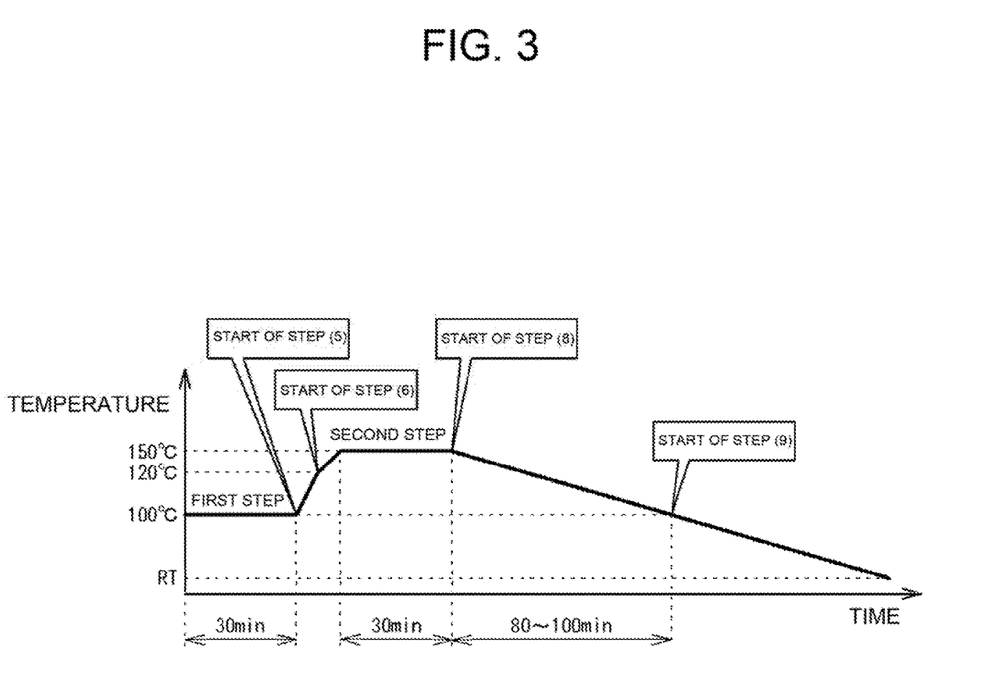
FIG. 3 is a diagram for describing steps for preparing base grease.

A grease composition containing base oil and a thickener was prepared as base grease through the following steps. FIG. 3 is a diagram for describing steps for preparing the base grease. In Examples 1 to 4 described later, a grease composition prepared in Comparative Example 1 was used as the base grease.

(1) PAO6 (produced by INEOS Oligomers, Durasyn 166 polyalphaolefin (product name), kinematic viscosity (40° C.): 29 to 33 mm$^2$/s) that is one type of poly-α-olefin is used as the base oil, and the base oil is heated to 100° C.

(2) The weights of the base oil, 1-aminooctane, and 4,4'-diphenylmethane diisocyanate (MDI) are measured.

(3) A half amount of the base oil (100° C.) and MDI are charged into a stainless steel container A, and are stirred for 30 minutes at 100° C.

(4) The remaining half amount of the base oil (100° C.) and 1-aminooctane are charged into another stainless steel container B, and are stirred for 30 minutes at 100° C.

Steps (3) and (4) are referred to as a first step.

(5) The amine solution in the stainless steel container B is gradually charged into the isocyanate solution by being dripped into the stainless steel container A. At this time, the liquid temperature increases by about 20° C. due to heat of reaction.

(6) After determination is made that the total amount of the amine solution in the stainless steel container B is charged into the stainless steel container A, the temperature is increased to 150° C.

(7) The solution is stirred while being heated, and the temperature is kept at 150° C. for 30 minutes. Step (7) is referred to as a second step.

(8) The heating is stopped, and the solution is cooled in still air to 100° C. while being stirred.

(9) After determination is made that the temperature is equal to or lower than 100° C., the stirring is stopped, and the solution is cooled in still air to normal temperature.

(10) Homogenization is performed with a three-roll mill. Treatment conditions are as follows.

Roll-to-roll clearance: 50 μm
Roll-to-roll pressure: 1 MPa
Rotation speed: 200 r/min
Treatment temperature: RT.

Through Steps (1) to (10), the base grease was prepared.

Grease compositions of Examples 1 to 4 and Comparative Examples 1 to 5 were prepared by using the base grease. At this time, the following reagents were used.

Inorganic additive: GARAMITE (registered trademark) 7303 produced by BYK-Chemie

Antioxidant A: phenyl-1-naphthylamine produced by BASF (grade: IRGANOX L 06)

Antioxidant B: octylated diphenylamine produced by Ouchi Shinko Chemical Industrial Co., Ltd. (grade: NOC-RAC AD-F)

Antioxidant C: zinc dibutyldithiocarbamate produced by Ouchi Shinko Chemical Industrial Co., Ltd. (grade: NOC-CELER BZ)

Polybutene A: NOF POLYBUTENE 10N, number average molecular weight: 1000, produced by NOF Corporation Polybutene B: NOF POLYBUTENE 30N, number average molecular weight: 1350, produced by NOF Corporation Example 1

The grease composition was prepared by mixing 2 parts by mass of the inorganic additive and 1 part by mass of each of Antioxidants A to C into 100 parts by mass of the base grease. The inorganic additive and the antioxidants were mixed into the base grease by using the revolution/rotation mixer under conditions that the rotation speed was 2000 rpm and the time was 3 minutes.

Example 2

The grease composition was prepared similarly to Example 1 except that the addition amount of the inorganic additive was changed to 5 parts by mass.

Example 3

The grease composition was prepared similarly to Example 1 except that the addition amount of the inorganic additive was changed to 10 parts by mass.

Example 4

The grease composition was prepared similarly to Example 1 except that the addition amount of the inorganic additive was changed to 20 parts by mass.

Comparative Example 1

The grease composition was prepared by mixing 1 part by mass of each of Antioxidants A to C into 100 parts by mass of the base grease. The antioxidants were mixed into the base grease by using the revolution/rotation mixer under conditions that the rotation speed was 2000 rpm and the time was 3 minutes.

Comparative Example 2

The grease composition was prepared by mixing 5 parts by mass of Polybutene A having a middle molecular weight and 1 part by mass of each of Antioxidants A to C into 100 parts by mass of the base grease. Polybutene A and the antioxidants were mixed into the base grease by using the revolution/rotation mixer under conditions that the rotation speed was 2000 rpm and the time was 3 minutes.

Comparative Example 3

The grease composition was prepared similarly to Comparative Example 2 except that the addition amount of Polybutene A was changed to 10 parts by mass.

Comparative Example 4

The grease composition was prepared by mixing 5 parts by mass of Polybutene B having a high molecular weight and 1 part by mass of each of Antioxidants A to C into 100 parts by mass of the base grease. Polybutene B and the antioxidants were mixed into the base grease by using the revolution/rotation mixer under conditions that the rotation speed was 2000 rpm and the time was 3 minutes.

Comparative Example 5

The grease composition was prepared similarly to Comparative Example 4 except that the addition amount of Polybutene B was changed to 10 parts by mass.

Evaluation of Grease Compositions

Figure 4:
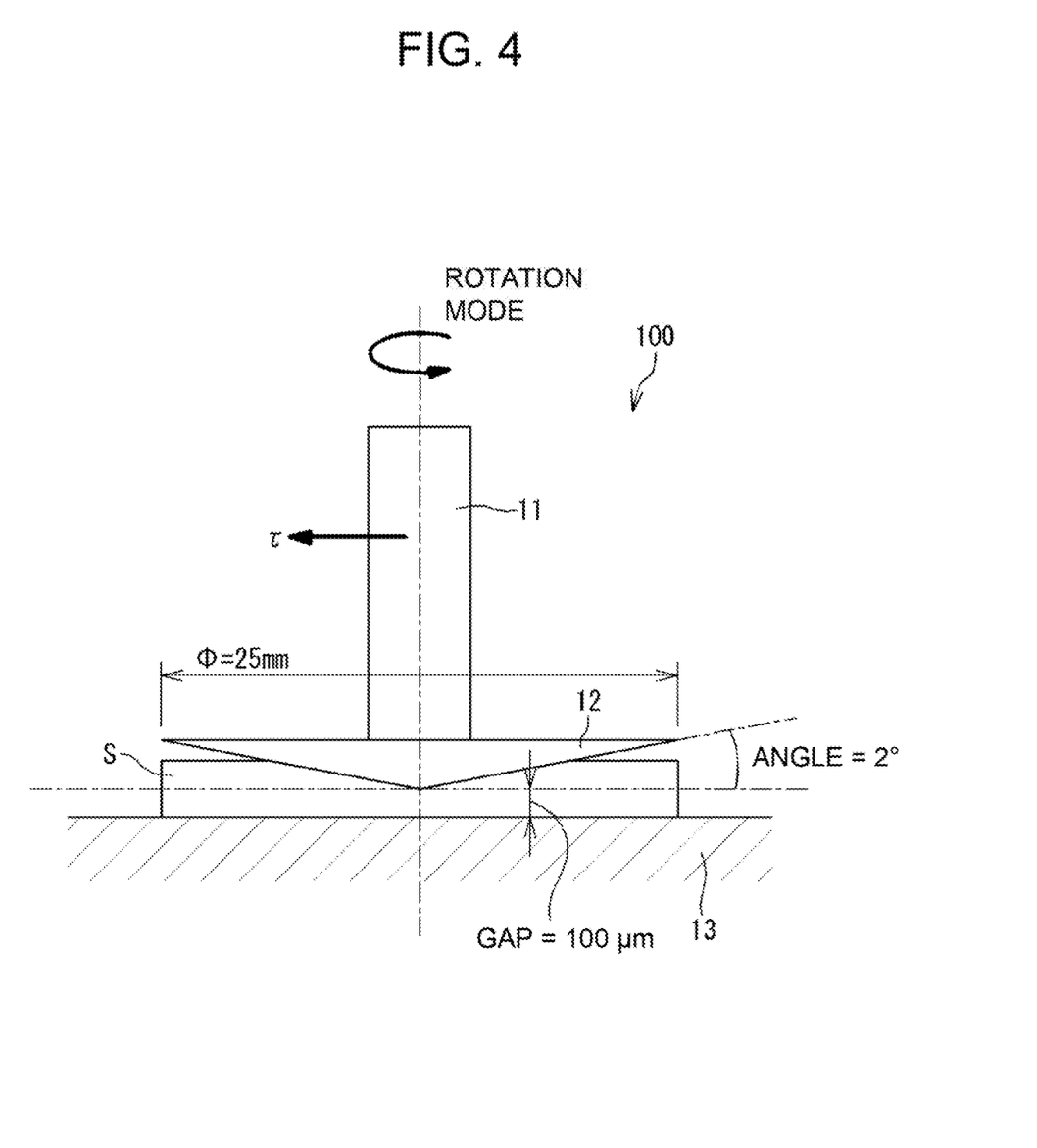
FIG. 4 is a schematic diagram of a rotary rheometer used in examples and comparative examples.
Figure 5:
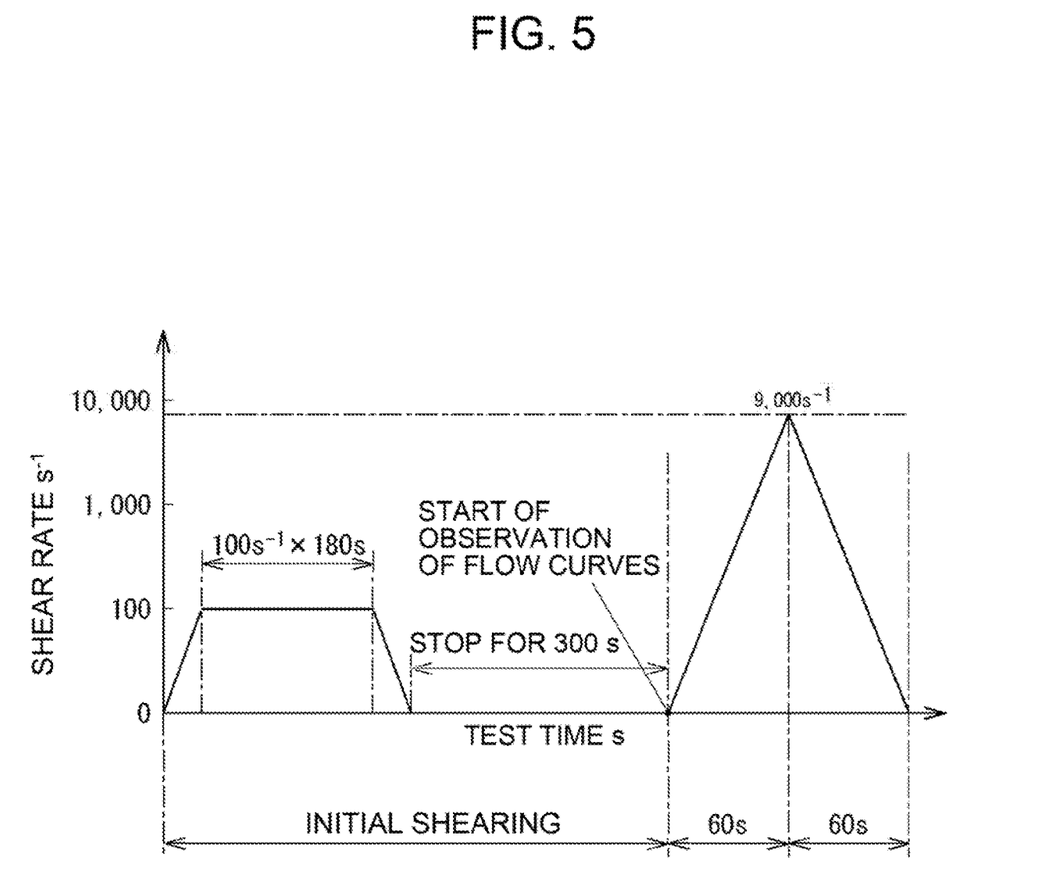
FIG. 5 is a diagram illustrating measurement conditions for the hysteresis loop in evaluation of the examples and the comparative examples.

The grease compositions prepared in Examples 1 to 4 and Comparative Examples 1 to 5 were evaluated. Results are shown in Table 1 and FIGS. 6 and 7. The evaluation results of the examples and the comparative examples are shown as performance ratios to the evaluation results of Comparative Example 1.

that sample grease S is set in the gap between the plate 13 and the cone plate 12 and the cone plate 12 is rotated. Measurement conditions for the hysteresis loop are shown in Table 2 and FIG. 5. In this evaluation, observation of the flow curves was started after initial shearing was performed under the measurement conditions shown in Table 2 and FIG. 5, thereby obtaining a rising flow curve of 60 seconds and a falling flow curve of 60 seconds. Table 1 shows, as the performance ratio, viscosity reduction energy of each of the examples and the comparative examples with respect to viscosity reduction energy of Comparative Example 1.

TABLE 2

| Item | Condition |
|---|---|
| Measurement jig (FIG. 4) | φ 25 mm, angle: 2°, cone plate |
| Measurement mode | Rotation |
| Gap between cone plate and plate (μm) | 100 |
| Shear rate (FIG. 5)   Initial shearing | After start of rotation: 100 $s^{-1}$ × 180 s, stop of rotation (300 s) |

TABLE 1

| | Item | | Unit | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|---|---|---|
| Component | Thickener | Diurea | mass % | 20 | 20 | 20 | 20 | 20 | 20 | 20 | 20 | 20 |
| | Base oil | PAO6 | mass % | 80 | 80 | 80 | 80 | 80 | 80 | 80 | 80 | 80 |
| | Additive (i) [1] | Inorganic additive | mass % | 2 | 5 | 10 | 20 | 0 | 0 | 0 | 0 | 0 |
| | | Polybutene A (middle molecular weight) | mass % | 0 | 0 | 0 | 0 | 0 | 5 | 10 | 0 | 0 |
| | | Polybutene B (high molecular weight) | mass % | 0 | 0 | 0 | 0 | 0 | 0 | 0 | 5 | 10 |
| | Additive (2) [1] (antioxidant) | Phenyl-1-naphthylamine | mass % | 1 | 1 | 1 | 1 | 1 | 1 | 1 | 1 | 1 |
| | | Octylated diphenylamine | mass % | 1 | 1 | 1 | 1 | 1 | 1 | 1 | 1 | 1 |
| | | Zinc dibutyldithio-carbamate | mass % | 1 | 1 | 1 | 1 | 1 | 1 | 1 | 1 | 1 |
| Performance ratio [2] | Viscosity reduction energy | | — | 1.9 | 2.3 | 2.1 | 1.1 | 1.0 | 1.9 | 2.7 | 1.6 | 2.2 |
| | Bearing running torque | | — | 2.5 | 2.8 | 2.3 | 1.6 | 1.0 | 1.2 | 1.0 | 1.2 | 1.2 |
| | Oxidation induction time (OIT) | | — | 1.0 | 1.3 | 1.8 | 2.3 | 1.0 | 0.8 | 0.8 | 0.8 | 0.8 |

[1] The amounts of Additive (1) and Additive (2) are contents with respect to the total amount of the base oil and the thickener.
[2] The performance ratio is a relative value with respect to the measured value of Comparative Example 1.

Methods for the evaluation shown in Table 1 are as follows.

(1) Viscosity Reduction Energy

A hysteresis loop was measured by using a rotary rheometer MCR 301 (produced by Anton Paar) illustrated in FIG. 4. Then, viscosity reduction energy was obtained by calculating the area of a portion surrounded by a rising flow curve and a falling flow curve based on a measurement result. A rotary rheometer 100 includes a flat plate 13 and a cone plate 12 arranged above the plate 13 with a gap therebetween. The cone plate 12 is fixed to a shaft 11. The cone plate 12 has a diameter φ of 25 mm and an angle of 2°. The gap between the cone plate 12 and the plate 13 is 100 μm. The rotary rheometer 100 performs measurement such TABLE 2-continued

| Item | Condition |
|---|---|
| Rising rate ($s^{-1}$) | 0 → 9000 (rise in 60 s) |
| Falling rate ($s^{-1}$) | 9000 → 0 (fall in 60 s) |
| n (Number of times) | 2 |
| Test temperature (° C.) | 25 |

(2) Bearing Running Torque

Figure 6:
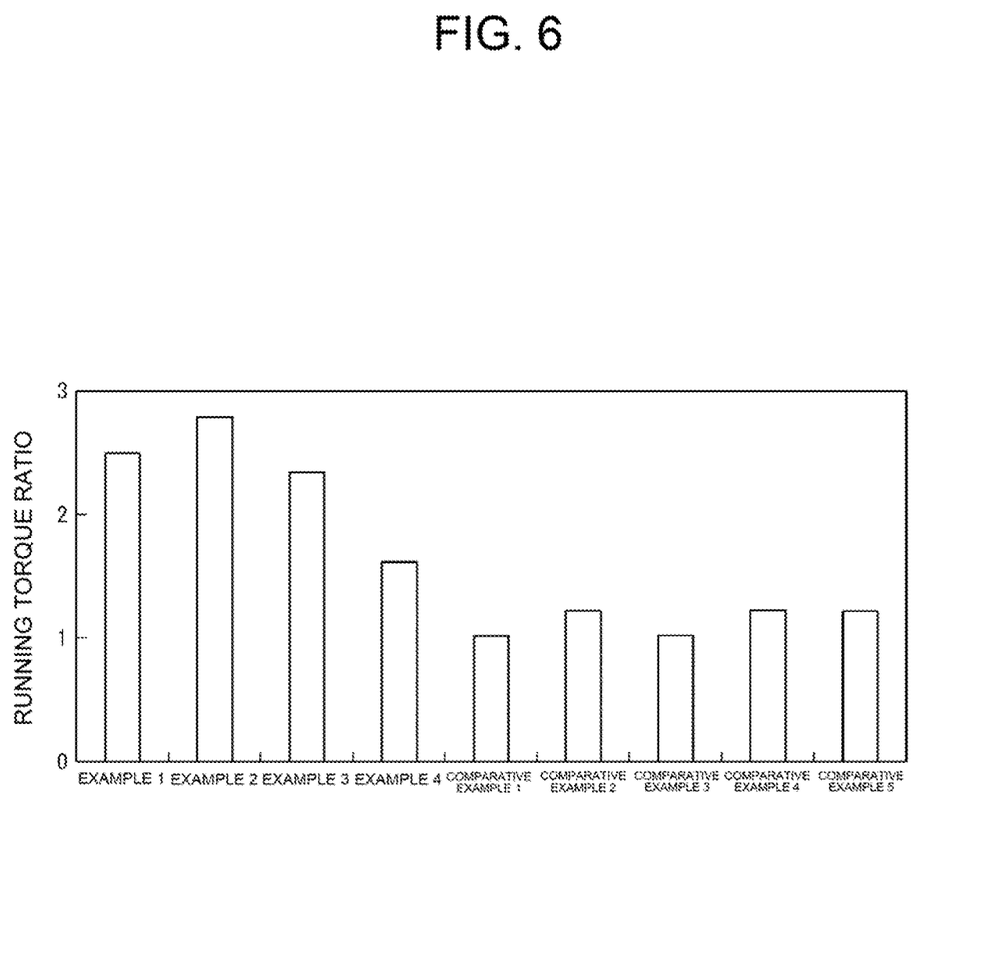
FIG. 6 is a diagram illustrating results of evaluation of bearing running torques of grease compositions prepared in the examples and the comparative examples.

Bearing running torques of the grease compositions prepared in the examples and the comparative examples were measured by using a running torque testing machine under conditions shown in Table 3. Each of the grease compositions produced in the examples and the comparative examples were filled in a test bearing 6202 2RUCM (with non-contact seals on both sides) so that the grease composition had 35 volume % with respect to the volume of a space surrounded by an inner ring, an outer ring, and the seals and excluding balls and a cage. The test bearing was set in the testing machine, rotated preparatorily at 1800 min$^{-1}$ for 60 seconds, then rested for 60 seconds, and rotated at 1800 min$^{-1}$ for 1800 seconds. A mean value of the torque in the last 60 seconds was obtained as the bearing running torque. Results are shown in FIG. 6. Table 1 and FIG. 6 show, as the performance ratio, an inverse of a value of the ratio of the bearing running torque of each of the examples and the comparative examples to the bearing running torque of Comparative Example 1, that is, a value obtained by dividing the bearing running torque of Comparative Example 1 by the bearing running torque of each of the examples and the comparative examples. As the value of the performance ratio increases, the bearing running torque decreases.

TABLE 3

| Item | Condition |
| --- | --- |
| Test bearing | 6202 2RUCM |
| Grease amount filled in bearing | Amount corresponding to 35% of space volume |
| Axial load | 44N |
| Contact pressure (calculation) | 0.93 GPa |
| Rotation speed | 1800 min$^{-1}$ |
| Ambient temperature | 25° C. (room temperature) |
| Test time | 1800 s (60 s in preparatory rotation) |
| Measurement item | Running torque (mean value in last 60 s) |

(3) Oxidation Induction Time (OIT)

Oxidation induction times (OITs) of the grease compositions prepared in the examples and the comparative examples were measured under conditions shown in Table 4 in conformity with "ASTM D5483-05 (2015) Standard Test Method for Oxidation Induction Time of Lubricating Greases by Pressure Differential Scanning Calorimetry".

TABLE 4

| Item | Condition |
| --- | --- |
| Test temperature | 200° C. |
| Measurement method | Isothermal method |
| Oxygen pressure | 3.5 ± 0.2 Mpa |
| Oxygen flow rate | 100 ± 10 mL/min |
| Sample amount | 2.0 ± 0.2 mg |
| Measurement item | Oxidation induction time (OIT) |
| Standards applied | ASTM D5483 "OXIDATION INDUCTION TIME OF GREASES" |
| Measurement apparatus | HP DSC 2$^+$ (METTLER TOLEDO) |

Figure 7:
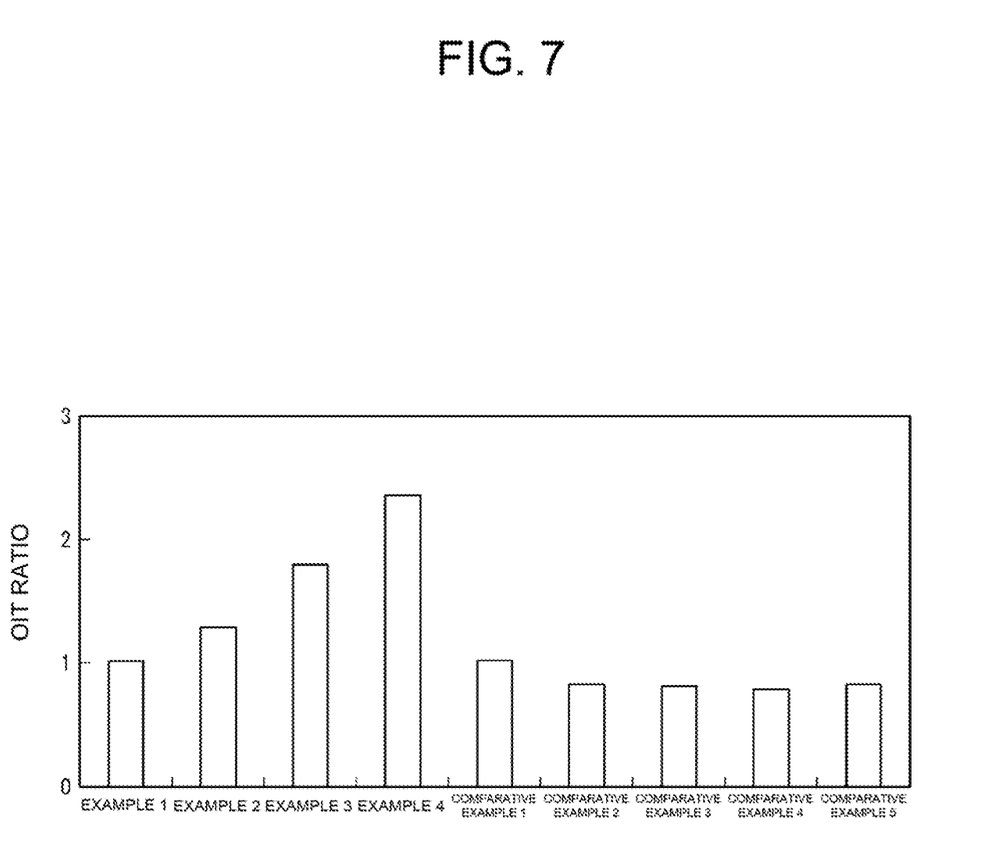
FIG. 7 is a diagram illustrating results of evaluation of oxidation induction times (OITs) of the grease compositions prepared in the examples and the comparative examples.

Table 1 and FIG. 7 show, as the performance ratio, the oxidation induction time of each of the examples and the comparative examples with respect to the oxidation induction time of Comparative Example 1. The oxidation induction time (OIT) is one method for evaluating oxidation stability of the grease composition, that is, one heat resistance evaluation method conforming to the ASTM standards. As the oxidation induction time increases, the heat resistance increases, thereby meaning a longer lubrication life.

The results of the examples and the comparative examples demonstrate that the grease composition according to the embodiment of the present disclosure has great viscosity reduction energy and can contribute to torque reduction of a rolling bearing filled with the grease composition, and the heat resistance can be improved.

What is claimed is:

1. A grease composition comprising:
    base oil;
    a thickener; and
    an inorganic additive, wherein
    the base oil is a poly-α-olefin having a base oil kinematic viscosity of 15 to 50 mm$^2$/s at 40° C.,
    the thickener is a diurea expressed by Structural Formula (1), $$R^1—NHCONH—R^2—NHCONH—R^3 \qquad (1)$$

where $R^1$ and $R^3$ represent functional groups independent of each other and expressed by —$C_nH_{2n+1}$ (n is an integer of 6 to 10), and $R^2$ represents —$(CH_2)_6$—, —$C_6H_3(CH_3)$—, or —$C_6H_4$—$CH_2$—$C_6H_4$—,
    a content of the thickener is 10 to 22 mass % with respect to a total amount of the base oil and the thickener,
    the inorganic additive is a mixture containing sepiolite and bentonite, and is organically modified, and
    a content of the inorganic additive is 2 to 20 mass % with respect to the total amount of the base oil and the thickener.

2. The grease composition according to claim 1, further comprising an antioxidant, wherein
    the antioxidant is at least one of 0.5 to 3 mass % of phenyl-1-naphthylamine with respect to the total amount of the base oil and the thickener, 0.5 to 3 mass % of octylated diphenylamine with respect to the total amount of the base oil and the thickener, and 0.5 to 3 mass % of zinc dibutyldithiocarbamate with respect to the total amount of the base oil and the thickener.

3. A rolling bearing filled with the grease composition according to claim 1.

* * * * *